United States Patent [19]
Morisaki

[11] 3,870,383
[45] Mar. 11, 1975

[54] CASSETTE-TYPE BEARING UNIT

[75] Inventor: Nobukazu Morisaki, Aichi-ken, Japan

[73] Assignee: Daido Metal Company, Ltd., Kita-ku, Nagoya, Japan

[22] Filed: June 5, 1974

[21] Appl. No.: 476,608

[30] Foreign Application Priority Data
Oct. 3, 1973 Japan.............................. 48-111296

[52] U.S. Cl.................... 308/82, 184/6.17, 308/125
[51] Int. Cl. ........................................... F16c 33/04
[58] Field of Search ............ 308/78, 121, 124, 125, 308/83, 87 R; 184/6.17

[56] References Cited
UNITED STATES PATENTS
947,105  1/1910  Jones................................ 308/82 X
2,685,658  8/1954  Feiertag.......................... 308/125 X
3,246,934  4/1966  Locke................................ 308/83 X

*Primary Examiner*—Lloyd L. King
*Assistant Examiner*—Michael Mar
*Attorney, Agent, or Firm*—Karl W. Flocks

[57]  ABSTRACT

A cassette-type bearing unit in which a bearing housing comprising outer and inner walls connected together in the radial direction by means of ribs includes therein a bearing, a fibrous member having oil affinity, and the like, so that a structure for automatically supplying lubricating oil is formed, and which can be produced at a low manufacturing cost.

7 Claims, 7 Drawing Figures

CASSETTE-TYPE BEARING UNIT

The present invention relates to a cassette-type bearing unit, and more particularly to a cassette-type bearing unit which can be most advantageously applied in small-sized electric motors. Heretofore, in accordance with the prior art, there have been used as the plain bearings for small-sized electric motors of 1 h.p. or less plain bearings made of white metal sintered copper-based alloys, sintered iron-based alloys, and the like, and as the ball-and-roller bearings for such electric motors there have been used ball bearings and the like. In lubricating said plain bearings, the prior art employs constructions wherein the casing or bracket for electric motor has spaces in which such a material as felt impregnated with lubricating oil is provided. However, these constructions lack versatility and interchangeability, and in particular, the constructions including thrust bearings and oil slingers are very much complicated and require a high level of technique for manufacturing, assembling, and servicing them. From an economic point of view, these features present a great disadvantage.

Moreover in these constructions, when seizure, wear, or some other failure takes place in the bearing structure, the cover for electric motor or even the bracket must be replaced with new one due to the lack of interchangeability. Further, because these constructions have no versatility, the bracket must be manufactured to suit the types of the electric motors available commercially, so that many types of the brackets are manufactured for many applications resulting in increases in manufacturing cost. And in practice, ball-and-roller bearings used for the aforesaid purpose accompany various problems such as noise during operation and rusting after a long time of use. Essentially, plain bearings are superior to ball-and-roller bearings in that they enjoy such advantageous features as a low level of noise during operation, an excellent load-carrying capacity, and a fairly long life. On the other hand, ball-and-roller bearings are superior to plain bearings in that they need no lubricant maintained in and around them and they are readily available commercially. Thus, it may be said that ball-and-roller bearings are the parts which are very easy to handle and use.

The present invention relates to a cassette-type bearing unit in which the aforesaid disadvantages of plain bearings and ball-and-roller bearings are eliminated while advantages of these bearings are fully utilized.

An object of the present invention is to provide a cassette-type bearing unit in which disadvantages of plain bearings and ball-and-roller bearings are precluded, while the ease of use of ball-and-roller bearings and various favorable features of plain bearings are fully utilized.

Another object of the present invention is to provide a cassette-type bearing unit in which a bearing structure is constructed as an independent cassette which can be produced at a low manufacturing cost, is simple in construction, has only a limited number of parts, and is provided with a structure for automatically supplying lubricating oil, so that versatility and interchangeability are attained and a bearing structure portion of a cover for electric motor or of a bracket is completed only by simply fitting said cassette into the cover for electric motor or into a bracket housing.

In accordance with the present invention, the following advantages can be accomplished:

1. The assembling operation is very easy, and the time, skill, and labor required for fitting the cassette-type bearing unit according to the present invention into the cover for electric motor or the bracket housing are substantially the same as those required when performing assembling operation using a ball-and-roller bearing.
2. The bracket housing into which said bearing unit is fitted can be readily manufactured by forming or stamping thanks to its simple construction.
3. The bracket housing into which said bearing unit is fitted has an inner diameter identical with the inner diameter used when employing a ball-and-roller bearing, thus attaining interchangeability.
4. Said bearing unit enjoys a life equal to or longer than those of conventional ball-and-roller bearings.
5. The bracket housing into which said bearing unit is fitted has a space in the axial direction thereof which extends from the rotor of electric motor to a position close to the outer end of said bracket housing, this being allowed by the construction of the electric motor used in this case. This means that the width (the length in the axial direction) of said bearing unit can be determined at any desired value over a fairly wide range, so that, as a matter of fact, amount and action of the lubricant in said bearing unit can be determined as desired.
6. Since said bearing unit employs a white metal bearing, an aluminum alloy bearing, or any other bearing which is preferable for this application, the noise during operation is greatly reduced in amount in comparison with conventional ball-and-roller bearings. The bearing in said bearing unit is force fitted into a bearing housing, and said bearing unit itself is in turn force fitted into said bracket housing, so that said bearing unit including said bearing is properly supported attaining a rigidity needed for preventing resonance.
7. All the parts are supported in said bearing unit in a very sure manner, and there is no possibility of their falling.

These objects and features of the present invention will become more clear by the following description of preferred embodiments taking reference with the attached drawings, in which.

The embodiments of the present invention will be explained hereunder with reference to the drawings.

Figure 1:
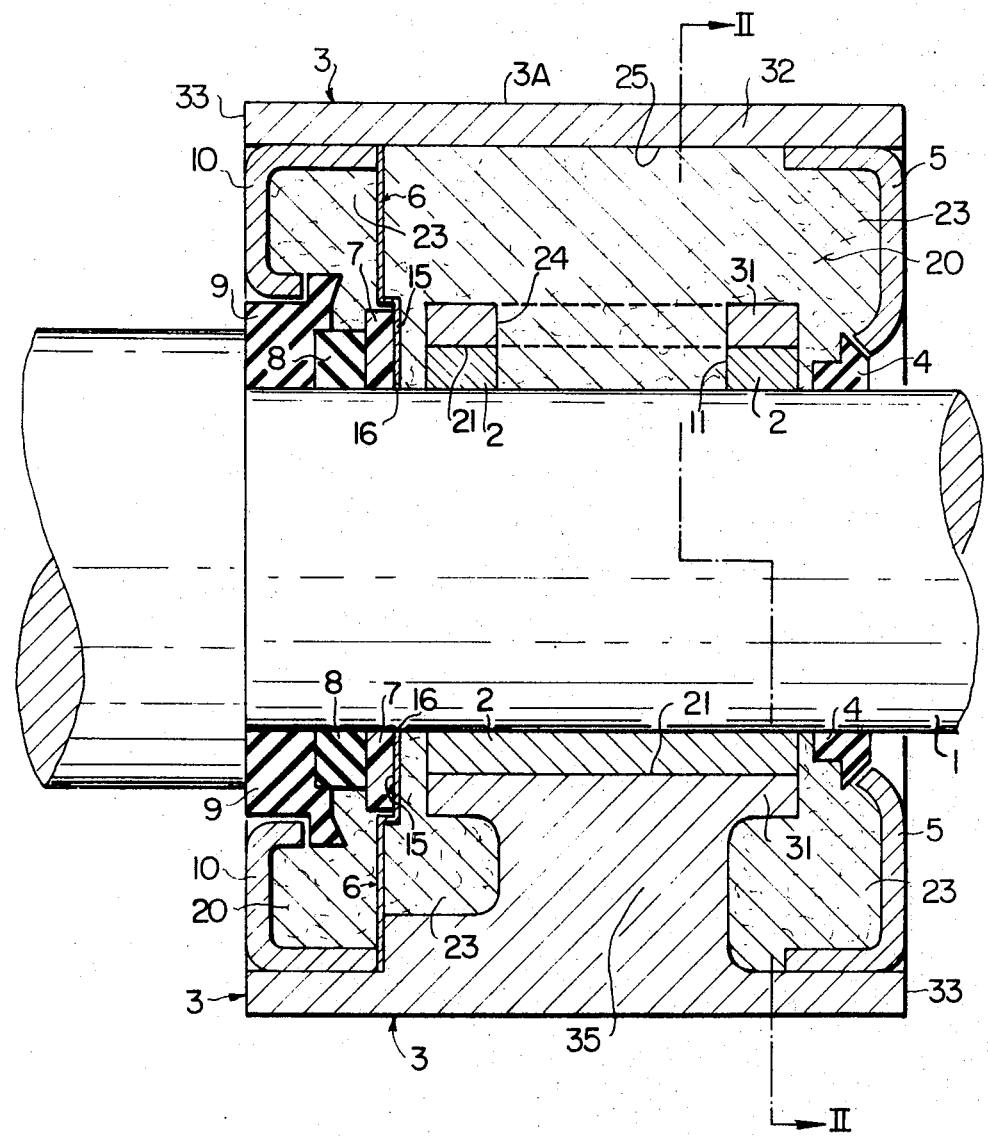
FIG. 1 is a longitudinal sectional side view taken along the line I—I of FIG. 2 and shows an embodiment of the bearing unit according to the present invention.
Figure 2:
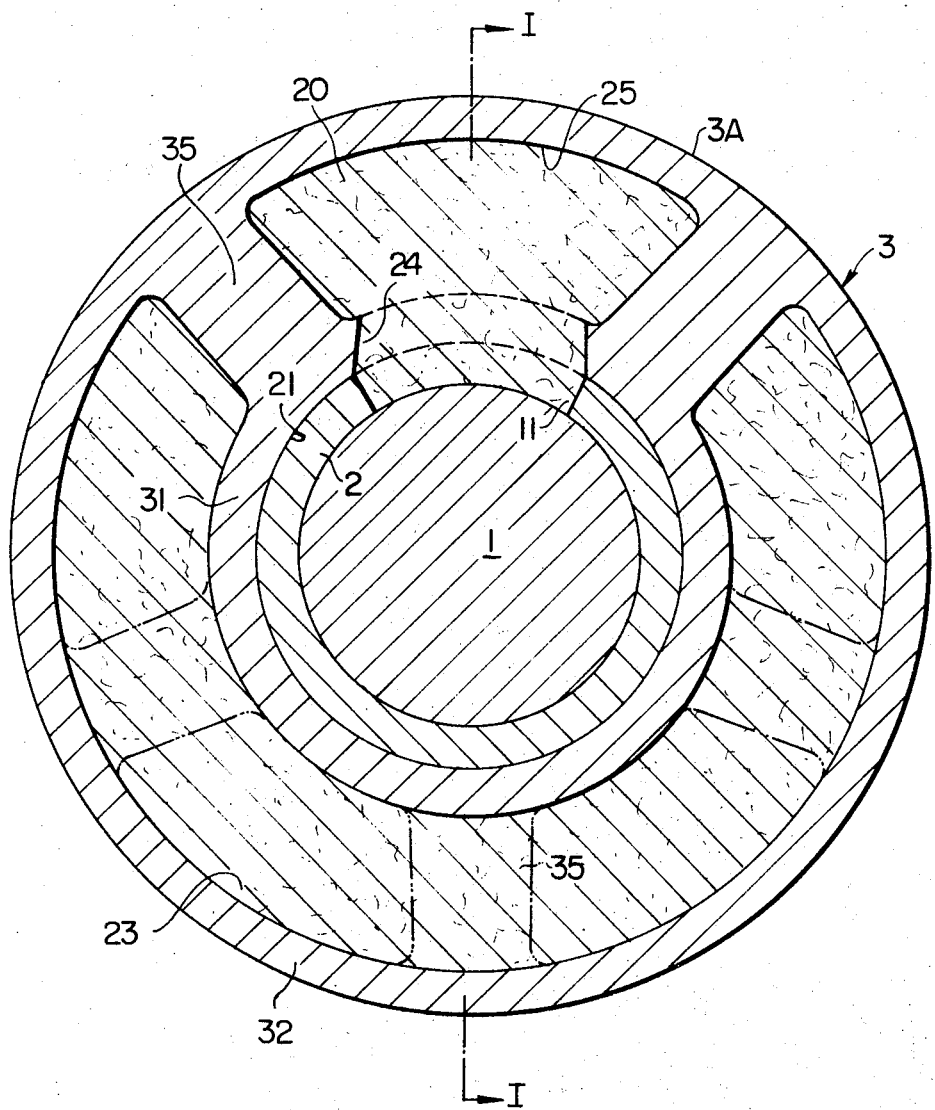
FIG. 2 is a partly broken away front view taken along the line II—II of FIG. 1.
Figure 4:
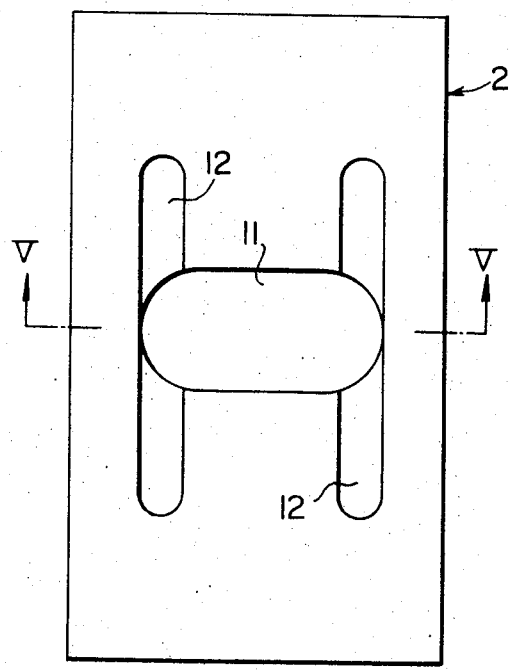
FIG. 4 is an exploded view illustrating a bushing.
Figure 5:
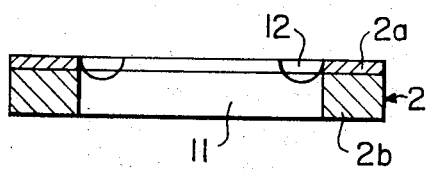
FIG. 5 is a sectional view taken along the line V—V of FIG. 4.

FIGS. 1 and 2 are respectively a longitudinal sectional side view and a partly broken away front view of a cassette-type bearing unit assembly which is one embodiment of the present invention. Said assemblies are provided symmetrically at the both ends of a main shaft 1 of the electric motor. FIG. 1 shows the cassette-type bearing unit assembly mounted on one end (on the right as viewed in a direction facing the side of the main shaft 1) of the main shaft 1. The one on the left is not shown. Thus, the main sahft 1 is of so-called two-point suspension-type. The numeral 2 shows a wound bushing-type plain bearing. FIG. 4 is an exploded view of a bushing 2, and FIG. 5 is a sectional view taken along the line V—V of FIG. 4. The numerals 2a, 2b, 11, and 12 respectively indicate a white metal bearing alloy, steel backings, an oil hole, and oil holding grooves. A bearing housing 3 may be, for instance, a die casting made of zinc. The numeral 3A designates the outer peripheral surface of the bearing housing 3. In the central part of the bearing housing 3 including the axis thereof there is defined a shaft hole 21, into which the bearing bushing or a ball-and-roller bearing are force fitted, by an inner wall 31 concentric with the axis of the bearing housing 3. Recesses 23 for receiving end cups, a thrust plate, and the like are defined radially intermediate the inner wall 31 and an outer wall 32 an axially inwardly of the both ends of the outer wall 32.

In the embodiment shown in FIGS. 1 and 2, the portions of said recesses 23 close to both axial ends 33 of the bearing housing 3 form continuous annular recesses covering the axially outer portions of the shaft hole 21. And the axially inner portions, i.e., the bottoms, of said circular recesses are in communication with each other in the axial direction by means of through holes 25 defined by ribs 35, said through holes 25 being the same in number as the ribs 35.

Figure 3:
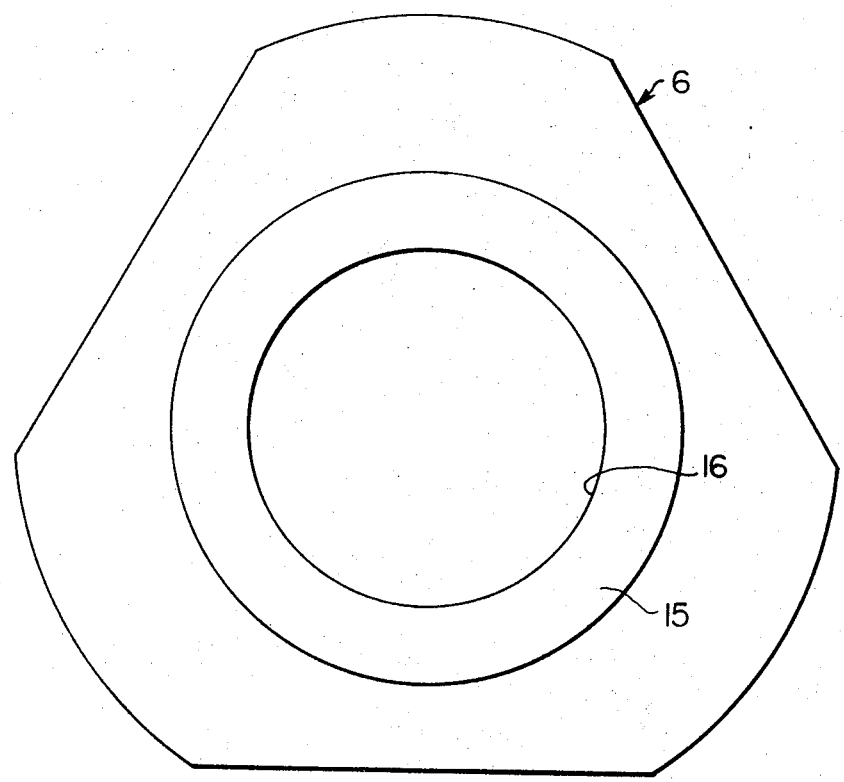
FIG. 3 is a front view showing a thrust plate.

An oil hole 24 which is substantially the same in size and configuration as the oil hole 11 in the bushing 2, is bored in the inner wall 31 of the bearing housing 3. Said oil holes 11 and 24 are filled with a fibrous member having oil affinity 20. An oil slinger 4 made of rubber or a plastic throws off by centrifugal force any lubricating oil running on the shaft 1 to flow out of the bearing housing, so that the oil is returned to the fibrous member having oil affinity 20 with the oil leakage being effectively prevented. As the fibrous member having oil affinity, for instance, a kind of fibrous member having an excellent oil-holding property such as disclosed in Japanese Pat. No. 268,503 (Japanese Patent Publication No. 8733/1960), U.S. Pat. No. 2,966,459, British Pat. No. 812,570, West German Pat. No. 1,204,028, Australian Pat. No. 247,793, French Pat. No. 1,189,108, Swedish Pat. No. 169,869, and the like will be used. An end cup 5 composed of a steel plate is fitted into the recess 23 to support the fibrous member having oil affinity 20 which is provided in the space in the bearing housing for the purpose of holding lubricating oil. The numeral 6 indicates a thrust plate made of a hardened spring steel, which is inserted into the recess 23. FIG. 3 illustrates the details of the thrust plate 6 which is in the shape of a triangle having rounded corners. The thrust plate 6 includes a circular central hole 16 and an indentation 15 formed on the outer periphery of the central hole 16. The numeral 7 designates a thrust washer adapted to be placed in said indentation 15, which may be formed of a plastic. A rubber washer 8 is provided so that the thrust washer 7 fits onto the surface of the thrust plate 6 in a satisfactory manner. The bearing housing includes another oil slinger 9 having the same action as the oil slinger 4. An end cup 10 has the action identical with that of said end cup 5. In the cassette-type bearing unit assembly having the construction described above, the loads in the radial direction are supported by the bushing 2 and the bearing housing 3. In this case, the bushing 2 does not produce resonance when the shaft 1 revolves because the bushing 2 is press fitted into the shaft hole 21 in the bearing housing 3.

The thrust caused by the shaft 1 is absorbed by the thrust plate 6, the thrust washer 7, and the rubber washer 8.

An explanation will be given hereunder on one embodiment of the method for assembling the cassette-type bearing unit according to the present invention. The assembling steps included in this embodiment are as follows:

1. The plain bearing 2 (or ball-and-roller bearing) is press fitted into the shaft hole 21 in the bearing housing 3. When performing this operation, the bearing housing 3 is placed on the table with the axis thereof being perpendicular to the table surface.

2. The end cup 5 is press fitted into the recess in the bearing housing 3 with the oil slinger 4 being placed on the end surfaces of the plain bearing 2 and the bearing housing 3.

3. The thrust plate 6 is inserted into the recess 23.

4. The thrust washer 7, the rubber washer 8, and the oil slinger 9 are placed on the thrust plate 6.

5. The end cup 10 is press fitted into the recess.

6. Using the oil hole 24, the space in the bearing housing 3 is filled with the fibrous member having oil affinity 20. In this operation, such a filler as those disclosed in Japanese Pat. No. 268,503 (Japanese Patent Publication No. 8733/1960) and Japanese Pat. No. 498,759 (Japanese Patent Publication No. 6445/1967) may be used.

Thus, the cassette-type bearing unit according to the present invention is assembled completely, and every necessary part is properly and surely supported in the bearing housing 3 eliminating all the possibilities of its falling. Needless to say, automatic assembling apparatus besides the aforesaid fillers may be used depending on the scale of production.

7. The cassette-type bearing unit thus assembled is press fitted into the casing (bracket) for electric motor such that the outer diameter 3A of the bearing housing 3 properly fits to the casing. The value of the outer diameter 3A is determined the same as for the ball-and-roller bearing, so that the time, skill, and labor required for this press fit operation are rendered substantially the same as those required when using a regular ball-and-roller bearing.

8. Then, the shaft 1 is inserted into the bearing housing from the side of the bearing housing where the oil slinger 9 is located. Thus, the assembly of the small-sized electric motor is completed. The time, skill, and labor required for this inserting operation are a little less than those required for assembling a shaft and an inner race into a ball bearing because the plain bearing has a relatively large clearance.

In general, life of plain bearings is nearly permanent, and it may be said that the life can be extended unlimitedly if a proper supply of lubricant is maintained. As described previously, the inner space of bearing assembly determines the lubricant-holding property indispensable in attaining such an unlimited life. In the present invention, the lubricant-holding property can be improved by forming a sufficient inner space with the use of the ample spatial extension available in the axial direction, with due consideration being given to the bearing life required. In addition, as for the noise during operation, a satisfactory condition can be maintained at all times since this bearing unit employs film lubrication.

Figure 6:
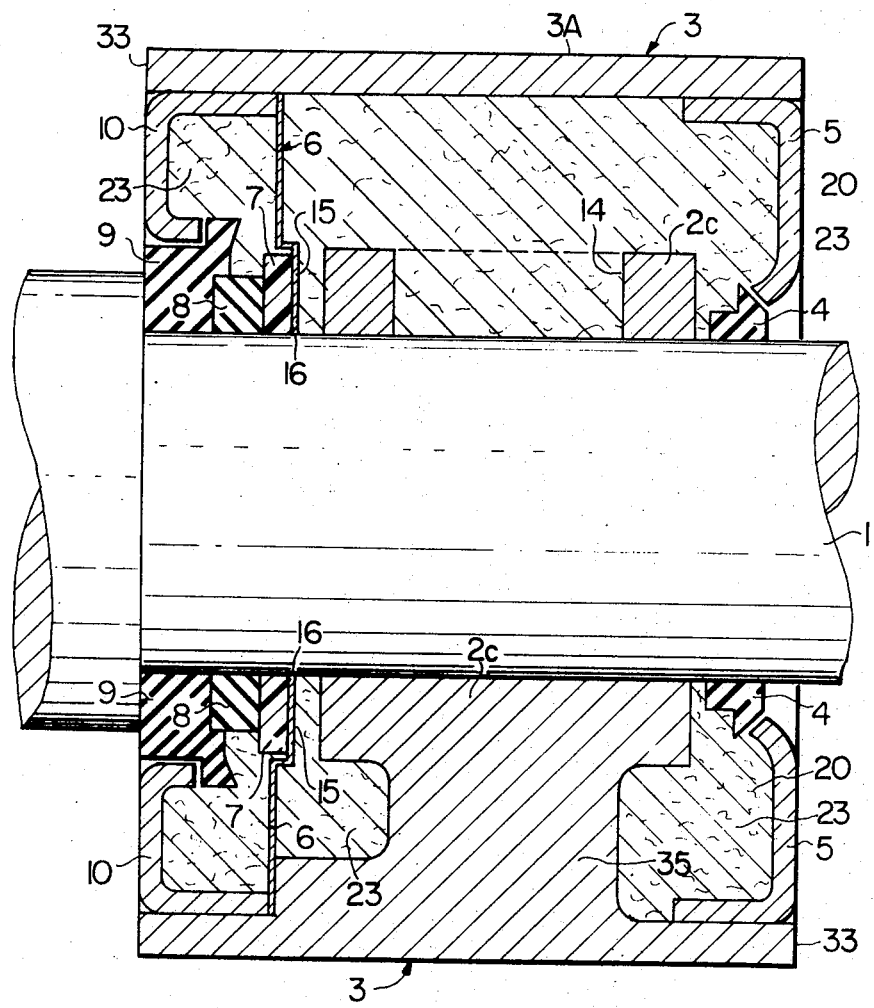
FIG. 6 is a longitudinal sectional side view showing another embodiment of the present invention.
Figure 7:
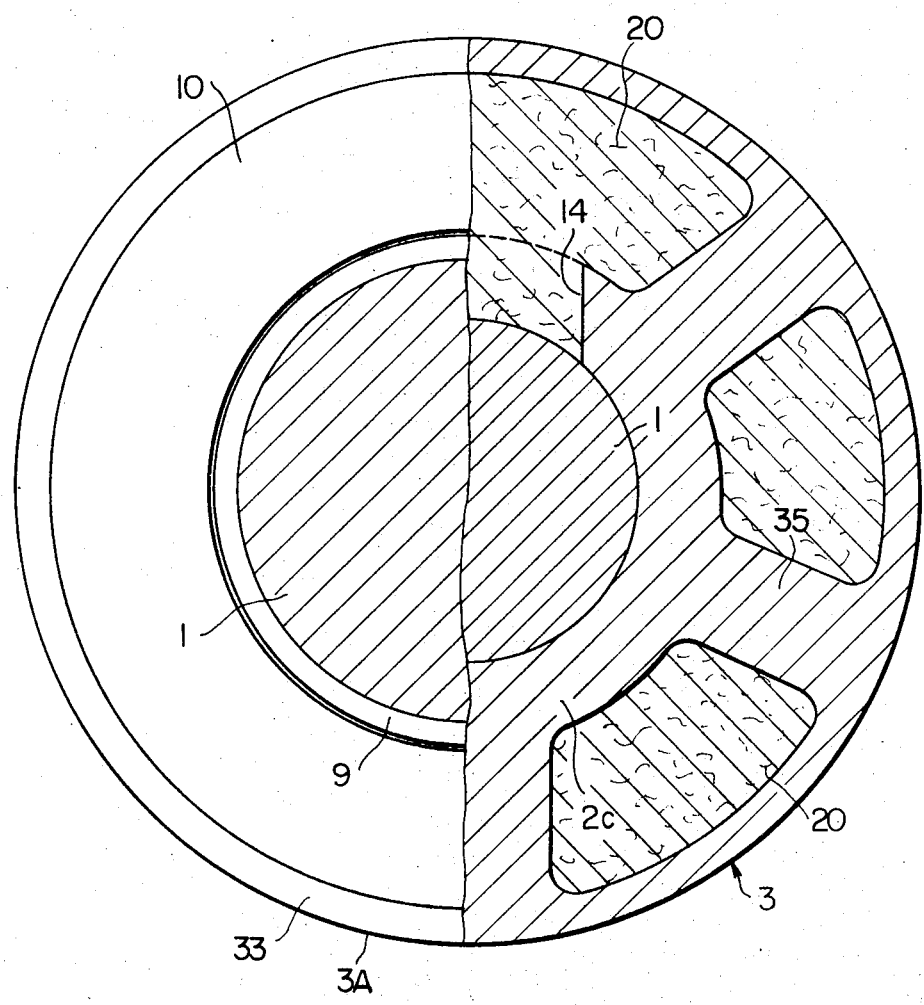
FIG. 7 is a partly broken away front view illustrating said another embodiment of the present invention.

FIGS. 6 and 7 are respectively a longitudinal sectional view and a partly broken away front view of a cassette-type bearing unit which is another embodiment of the present invention and in which an integral bearing unit is formed to have dual function as a housing and a bearing. Throughout the figures, like numerals indicate like or equivalent parts.

In this embodiment, there is provided a solid plain bearing portion 2C which is made of an aluminum bearing alloy and formed integrally with a housing. This means that the two parts used in the embodiment of FIG. 1 and described previously, i.e., the bearing housing 3 and the bushing-type plain bearing 2 are formed as an integral unit. In the bearing portion 2C is defined a shaft hole which is concentric with the axis of bearing housing and into which a main shaft 1 is inserted. The numeral 14 designates an oil hole in the plain bearing 2C. The oil hole 14 is filled with a fibrous member having oil affinity in the same manner as the embodiment described previously.

This embodiment enjoys the following advantages over the embodiment previously described:

1. Assembling operation is very easy thanks to the decreased number of parts.
2. Manufacturing cost can be reduced to a large extent.
3. Weight is decreased greatly.

No explanation will be necessary for the parts other than those described above since such other parts are identical with the corresponding ones used in the embodiment described previously. Although in this specification the explanation has been made on a case where an aluminum bearing alloy is employed as the material for manufacturing a solid bearing formed integrally with a housing, the material for manufacturing the bearing is, needless to say, not limited to said alloy and other bearing alloys may be used as desired.

The fibrous member is also, needless to say, not limited to those disclosed in afore-mentioned patents upon using the fibrous member having oil affinity and various kinds of fibrous member may be used as desired.

As has been described in the foregoing, the cassette-type bearing unit according to the present invention has only a small number of parts, is very easy to assemble and fit into the casing for electric motor, and in addition enjoys a long life because it incorporates a fibrous member having oil affinity which can supply lubricating oil automatically.

The cassette-type bearing unit according to the present invention is a useful bearing device which boasts versatility and interchangeability as well as the same ease of use as ball-and-roller bearings and all the advantages of plain bearings.

I claim:

1. A cassette-type bearing unit comprising;
a bearing housing including an annular inner wall concentric with the axis and extending in the axial direction, an annular outer wall concentric with said inner wall, and ribs extending radially between said inner and outer walls and connecting said inner and outer walls together in the radial direction, and further including a shaft hole defined by the inner surface of said inner wall, recesses formed inwardly of the both axial ends of said outer wall and outwardly of the end edges of said ribs, through holes defined by said ribs and establishing axial communication between said two recesses at positions radially outwardly of said inner wall an oil hole extending from said through hole to said shaft hole;
a bushing-type plain bearing or a ball-and-roller bearing press fitted into said shaft hole to support together with said housing the load applied to the main shaft in the radial direction;
a thrust plate inserted into at least one of said recesses to support the thrust produced in the main shaft;
a thrust washer provided in at least one of said recesses to be in contact with said thrust plate and to be concentric with said shaft hole and adapted to support the thrust produced in the main shaft together with said thrust plate;
first and second oil slingers having oil-throwing collars which are provided outwardly of the both ends of said bearing to be concentric with said bearing and adapted to prevent the outflow of lubricating oil running on the main shaft;
first and second end cups press fitted to the inner surface of the outer wall at the both axial ends of the housing;
and a fibrous member having oil affinity filled in said recesses and said through holes to hold lubricating oil and supply the lubricating oil to the bearing.

2. A cassette-type bearing unit in accordance with claim 1 in which said bearing housing is constructed of a bearing alloy, characterized in that the inner surface of said housing which defines the shaft hole forms a bearing surface for supporting the main shaft, and said housing is formed integrally with a bearing and has dual function as a housing and a bearing.

3. A cassette-type bearing unit in accordance with claim 1 in which said thrust plate is provided with a central hole and an annular indentation formed on the outer periphery of said central hole, characterized in that the thrust washer is arranged to be in surface-to-surface contact with said annular indentation, and a rubber washer is provided between said first or second oil slinger and said thrust washer so that said thrust washer is placed in surface-to-surface contact with said thrust plate in a very sure manner.

4. A cassette-type bearing unit in accordance with claim 1 in which said thrust plate is interposed between the end edges of said ribs and the outer peripheral edge of said first or second end cup so as to be fixed securely in said recess.

5. A cassette-type bearing unit in accordance with claim 1 in which said bearing housing is a die casting made of zinc alloy.

6. A cassette-type bearing unit in accordance with claim 2 in which the bearing alloy of which said bearing housing is made is an aluminum bearing alloy.

7. A cassette-type bearing unit in accordance with claim 1 in which said thrust plate is made of a hardened spring steel.

* * * * *